Aug. 1, 1961     L. R. POSCHADEL     2,994,320
COOL STIRRING KETTLE
Filed June 26, 1956
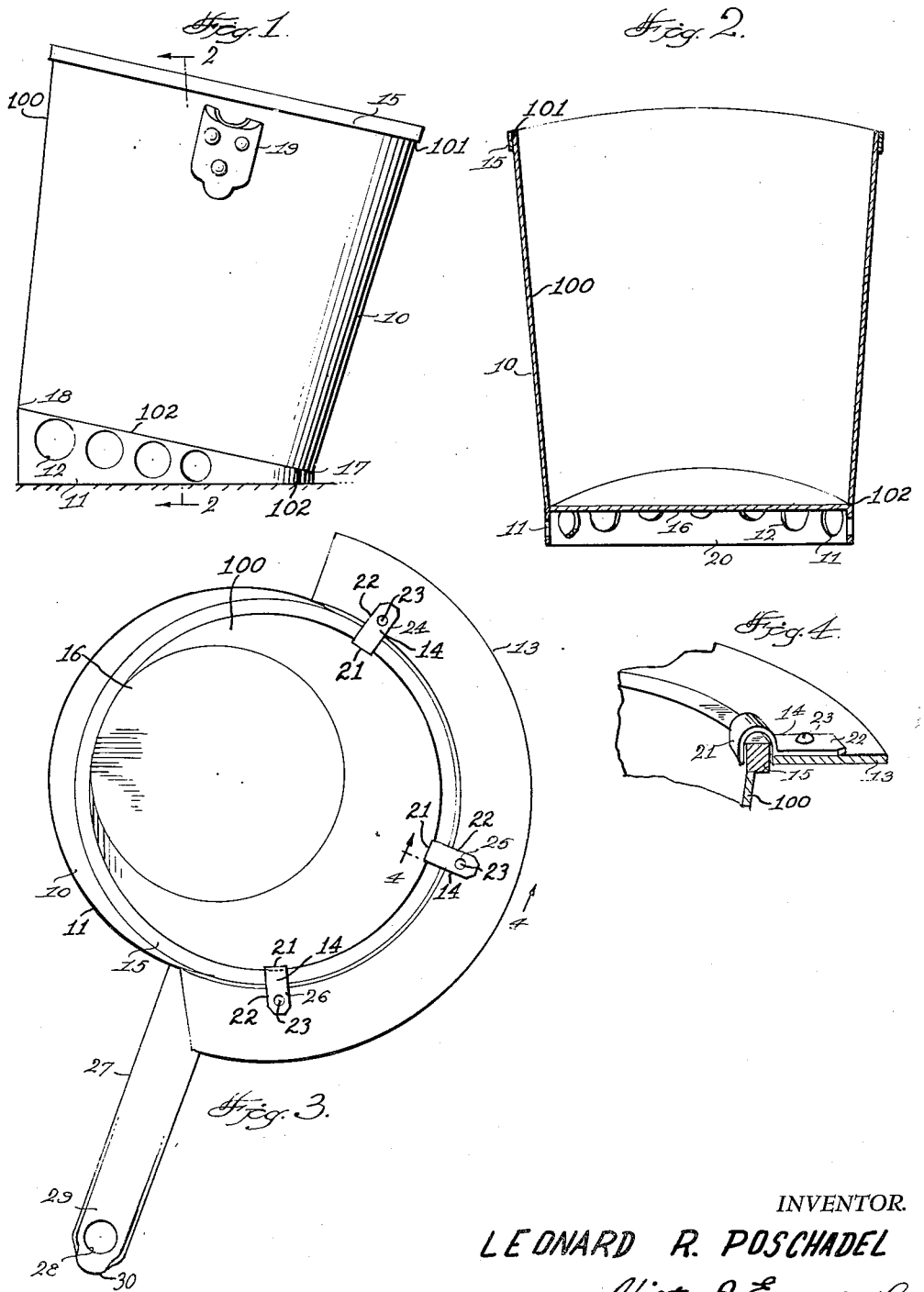
INVENTOR.
LEONARD R. POSCHADEL
BY *Victor J. Evans & Co.*
ATTORNEYS 2,994,320
COOL STIRRING KETTLE
Leonard R. Poschadel, 139 E. Garfield Ave.
Milwaukee 12, Wis.
Filed June 26, 1956, Ser. No. 594,054
1 Claim. (Cl. 126—376)

This invention relates to the culinary art and particularly pots, pans, and kettles used for cooking products over gas and electric burners, such as where stirring with a spoon is required, and in particular a kettle having a tilting base whereby the upper rim of the kettle is offset in relation to the base so that the fingers of a hand gripping a spoon stirring a product in the kettle are not subjected to the intense heat radiated from the burner, and also from the heat or steam of the product being cooked within the kettle.

The purpose of this invention is to provide means for supporting a kettle in an inclined position in order to remove the hand of a housewife gripping a stirring spoon from the direct path of hot gases passing upwardly from the burner and also from within the kettle.

With conventional upright kettles, pots, and other pans the heat of a burner upon which the kettle is positioned travels upwardly around the straight wall of the kettle with the heat on all sides equal and a hand gripping a spoon for stirring products in the kettle is directly subjected to the heat so that fingers thereof are often burned. With this thought in mind this invention contemplates tilting a kettle whereby the upper end is offset in relation to the base so that a product in the kettle may be stirred without subjecting a hand gripping a spoon directly to the heat of the burner.

The object of tnis invention is, therefore, to provide means integral with a kettle whereby the kettle is supported in an inclined position as products are cooked therein.

A further object of the invention is to provide a tilting kettle or pot which is of a simple and economical construction.

With these and other objects and advantages in view the invention embodies a kettle having a continuous side wall extended from a bottom with a supporting section having openings therein positioned at the bottom of the kettle and adapted to support the kettle in an inclined position.

Other features and advantages of the invention will appear from the following description taken in connection with the drawing, wherein:

FIGURE 1 is a side elevational view of the improved kettle showing the kettle positioned whereby one side extends away from the base.

FIGURE 2 is a vertical section through the kettle taken on line 2—2 of FIG. 1.

FIGURE 3 is a plan view of the kettle showing the kettle with a deflecting baffle positioned on the low or extended side thereof.

FIGURE 4 is a cross section through the upper edge of the kettle taken on line 4—4 of FIG. 3 with the parts shown on an enlarged scale showing a clip for supporting the baffle on the rim of the kettle.

Referring now to the drawing wherein like reference characters denote corresponding parts the improved cool stirring kettle of this invention includes a container 10, having a circular vertically tapering wall 100 that has an upper periphery 101 and a lower periphery 102, and the upper periphery 101 is of greater circumference than the lower periphery 102. The container 10 also includes a tapering skirt 11 with perforations 12 therein extended from the lower end of the wall of the container and a baffle 13 suspended by spring clips 14 from a solid rim 15 that is formed integral with the upper periphery 101 of the wall 100 of the container 10.

The container 10 is provided with a bottom 16 which slopes upwardly from a point 17 at the front to a point 18 at the opposite side and the skirt 11 is formed integral with the lower periphery 102 of the well 100, as shown in FIG. 2.

The kettle may also be provided with handles 19 as shown in FIG. 1 or other lifting or supporting elements. The lower end of the skirt is open providing an open air chamber 20 below the bottom of the upper container and with the openings 12 provided in the skirt 11 air is free to circulate through the lower part of the container.

The clips 14 include U-shaped sections 21 from which flanges 22 extend and the clips are retained in position by bolts 23 which extend through the flanges 22 and also through the baffle 13. The spring clips are provided in different positions, such as the positions 24, 25, and 26 and with the clips mounted in this manner the baffle may be moved to different positions upon the rim of the kettle or the like. The baffle 13 is provided in an extended handle 27 having a drain opening 28 therein and with the area 29 around the opening formed to provide a depression with a spout 30 at the end, products from the container 10 may be poured therefrom with very little danger of spilling the products upon a floor or the like.

The skirt and other elements positioned around the lower end of the device provide means for capturing the heat.

There has thus been provided a container 10 having a tapering wall 100, an inclined bottom 16 and an integral tapering skirt 11 that has a portion thereof that is of greater height than that portion thereof that is diametrically opposite thereto. Thus when the container is positioned on a flat support, the vertical axis of the skirt is in vertical relation to the support, however, the variation of the heights of the opposed portions of the skirt will cause the tapering wall of the container to extend at an angle to the vertical axis of the skirt. Thus the periphery of the bottom of the container will coincide with the inclination of the upper periphery of the skirt and the row of perforations 12 in the skirt extend upwardly in an inclined plane toward that portion of the skirt having the greater height, thus the inclination of the row of perforations will coincide with a plane that is parallel to the bottom of the container.

It will be understood that the cool stirring kettle may be provided in different designs and in different sizes and suitable means may be provided for retaining the kettle in an inclined position.

It will be understood that modifications within the scope of the appended claim may be made in the design and arrangement of the parts without departing from the spirit of the invention.

What is claimed is:

A container having a body portion formed by a circular vertically tapering wall so that the upper periphery of the wall is of greater circumference than the lower periphery of the wall, a solid rim formed integral with the upper periphery of the wall, a tapering skirt portion formed integral with the lower periphery of the wall, said skirt being of greater height for a portion thereof than that portion thereof diametrically opposite to the portion having the greater height, said skirt portion when placed on a flat support having the vertical axis thereof disposed in vertical relation to said support and said skirt by its variation in height causing the tapering wall of the container to extend at an angle to the vertical axis of the skirt, a bottom for the container secured to the inner surface of said tapering wall so that the periphery of said bottom coincides with the inclination of the upper periphery of said skirt and said skirt having a row of perforations therein extending upwardly in an inclined plane toward that portion of the skirt having the greater height and said row of perforations being in an inclined plane parallel to said bottom.

References Cited in the file of this patent

UNITED STATES PATENTS

| | | |
|---|---|---|
| 44,166 | David | Sept. 13, 1864 |
| 90,835 | Frank | June 1, 1869 |
| 914,828 | Hamburger | Mar. 8, 1909 |
| 1,125,581 | McGee | Jan. 19, 1915 |
| 1,974,796 | Davis | Sept. 25, 1934 |
| 2,423,219 | Armstrong | July 1, 1947 |
| 2,501,142 | Reichart | Mar. 21, 1950 |

FOREIGN PATENTS

| | | |
|---|---|---|
| 136,285 | Great Britain | Dec. 18, 1919 |
| 316,854 | Great Britain | Sept. 26, 1929 |
| 676,483 | Great Britain | July 30, 1952 |